Patented Feb. 6, 1945

2,369,041

UNITED STATES PATENT OFFICE 2,369,041

COMPOSITION FOR PRODUCING A DARK COLORED BREW FROM LEGUMES

William R. Graham, Jr., Kansas City, Kans., and Clark W. McCarty, Kansas City, Mo., assignors to American Dairies, Incorporated, Kansas City, Mo., a corporation of Maryland, and to The Quaker Oats Company, Chicago, Ill., a corporation of New Jersey No Drawing. Application March 18, 1942, Serial No. 435,203

2 Claims. (Cl. 99—28)

Our invention relates to a process and new composition of matter for producing a dark colored potable beverage and covers also the method of producing said composition.

An excellent tasting beverage may be prepared from legumes if they are properly treated and dried. Legumes such as alfalfa, clover, lespedeza, pea vines, and the like are within the contemplation of our invention; however, it is to be understood that the legumes specifically listed are given by way of illustration and not by way of limitation. The legumes are first crushed so that the plant cells are broken down sufficiently to release the enzymes and other cellular content. The enzymes and bacteria on the plant bring about fermentation. The flavor of the resulting product is determined by the extent of the fermentation. The crushed legumes are permitted to ferment for a period of from thirty minutes to three days, depending on the desired flavor. After fermentation, the legumes are heated to a temperature sufficient to destroy or partially destroy the chlorophyl but insufficient to char the organic material. This dried product may then be stored without danger of decomposition or further fermentation. By substantially destroying the chlorophyl the product will produce a distinctive and tasty dark colored beverage when boiled or steeped in water.

An important object of our invention, therefore, is the provision of a product that may be prepared from legumes that can be stored without decomposition or fermentation and which will produce a palatable beverage when boiled or steeped in water.

To prepare a product embodying the invention, the leaves of a selected legume are crushed in any suitable manner to break down the cells of the leaves. It is desirable, however, that the crushing operation be performed, so far as possible, without destroying the entity or character of the leaves.

After the leaves have been sufficiently crushed or broken, they are placed in a container and permitted to ferment for a period of from thirty minutes to three days. When the cells of the leaves are broken down, the plant enzymes and other cellular content are released. The bacteria on the plant, together with the enzymes, bring about fermentation. The fermentation map be stopped at any time by application of heat. Inasmuch as the flavor of the beverage made from the resulting product is largely dependent upon the period of fermentation, this period is varied in accordance with the particular taste the product is to have. After the fermentation has proceeded for a selected interval, the leaves are dried to the extent that the chlorophyl content is destroyed or substantially destroyed but without appreciable charring of the organic material. Most enzymes are sensitive to an elevation of temperature and are said to be thermo-labile. Therefore, the final drying should be at a temperature sufficient to destroy the enzymes and stop fermentation. A temperature of between 150° F. and 500° F. is suitable for most legumes and this temperature should be sustained for a length of time sufficient to drive off the water in the leaves and to substantially destroy the chlorophyl content of the leaves. By destroying or substantially destroying the chlorophyl content, a dark colored brew is produced. It is important, of course, that the temperature be controlled so as not to char the organic material in the leaves.

If desired, the leaves may be subjected to a preliminary drying before being crushed. Inasmuch as the enzymes are destroyed by elevated temperatures, the preliminary drying or "wilting" is usually conducted at room temperatures and under either normal or reduced pressure. The purpose of the preliminary drying is to remove some of the water from the leaves before they are crushed.

As an example of a typical operation, red clover leaves were wilted for eighteen hours at room temperature (70°–75° F.). After wilting, the clover leaves were passed through rollers to break down the cell structure. During the rolling operation, the leaves have a tendency to darken in color and develop a moist slippery feel.

The mat of rolled clover leaves was then put in an incubator and held at a temperature of 65° F. to 70° F. for seven hours during which time fermentation took place, probably due to enzymatic and bacterial action. This fermentation was terminated at a time when a pleasant aroma had developed in the mat. The period necessary to develop the aroma had been determined by a series of tests and experimental work. It was found that the aroma usually begins to develop during the first hour of incubation and increases for a period of time. This pleasant aroma, after its initial generation, continues to develop for a period and then becomes unpleasant.

The fermentation time of seven hours was selected because at the end of this period a desirable product was obtained.

On removal from the incubator, the mat of clover leaves was placed in an oven and heated to a temperature of 280° F. until the mat was dry. During this heating the mat turned from a dark green to a brown or brownish-black at which time it was removed and disintegrated by rolling or crushing. The color and, to an extent, the taste of the brew produced is controlled by the time and temperature of the final heat treatment.

The product when steeped or boiled in water produces a clear brownish amber fluid having a pleasant aroma and taste.

Having thus described our invention, we claim:

1. A method of producing a dry product from the leafy portion of legumes from which may be produced a potable beverage comprising the steps of crushing the legumes into a mat, incubating conditions for enzymatic and bacterial action and permitting this fermentation to proceed until a pleasant aroma develops, then heating the fermented mat to a temperature to terminate fermentation and darken the color without charring and finally disintegrating the mat of dried fermented material.

2. A method of producing a dry product from the leafy portion of legumes from which may be produced a potable beverage comprising the steps of wilting the legumes to remove moisture and below a temperature at which enzymes are destroyed, crushing the legumes into a mat, incubating conditions for enzymatic and bacterial action and permitting this fermentation to proceed until a pleasant aroma develops, then heating the fermented mat to a temperature to terminate fermentation and darken the color without charring and finally disintegrating the mat of dried fermented material.

WILLIAM R. GRAHAM, Jr.
CLARK W. McCARTY.